United States Patent
Rasmussen

(10) Patent No.: US 7,836,779 B2
(45) Date of Patent: Nov. 23, 2010

(54) METHOD FOR OPERATING AN ELECTROMAGNETIC FLOWMETER AND ELECTROMAGNETIC FLOWMETER

(75) Inventor: Claus Nygaard Rasmussen, Sønderborg (DK)

(73) Assignee: Siemens Aktiengesellschaft, Munich (DE)

( * ) Notice: Subject to any disclaimer, the term of this patent is extended or adjusted under 35 U.S.C. 154(b) by 345 days.

(21) Appl. No.: 11/992,435

(22) PCT Filed: Sep. 21, 2005

(86) PCT No.: PCT/EP2005/010224
§ 371 (c)(1),
(2), (4) Date: Mar. 20, 2008

(87) PCT Pub. No.: WO2007/033697
PCT Pub. Date: Mar. 29, 2007

(65) Prior Publication Data
US 2009/0260452 A1    Oct. 22, 2009

(51) Int. Cl.
*G01F 1/58* (2006.01)
(52) U.S. Cl. .................................. 73/861.12
(58) Field of Classification Search ........................ None
See application file for complete search history.

(56) References Cited

U.S. PATENT DOCUMENTS

| | | | | |
|---|---|---|---|---|
| 3,955,413 A | * | 5/1976 | Steele et al. | 73/861.17 |
| 4,409,846 A | * | 10/1983 | Ueno | 73/861.17 |
| 4,704,908 A | * | 11/1987 | Blatter | 73/861.17 |
| 4,709,583 A | * | 12/1987 | De Paepe et al. | 73/861.17 |
| 6,763,729 B1 | * | 7/2004 | Matzen | 73/861.12 |
| 7,260,486 B2 | * | 8/2007 | Budmiger | 702/45 |
| 2006/0081067 A1 | * | 4/2006 | Budmiger | 73/861.08 |

FOREIGN PATENT DOCUMENTS

| | | |
|---|---|---|
| DE | 199 17 268 A1 | 11/2000 |
| DE | 10 2004 046 238 A1 | 3/2006 |
| EP | 0 969 268 A1 | 1/2000 |
| EP | 1 460 394 A2 | 9/2004 |

* cited by examiner

Primary Examiner—Harshad Patel

(57) ABSTRACT

A method for operating an electromagnetic flowmeter and a flowmeter are provided. A measuring tube is provided with a coil arrangement for producing a magnetic field at right angles to the direction of flow. The direction of current flow in the coil arrangement is altered periodically, and the current is kept essentially constant in one period after a rise to a predetermined value. A voltage and/or a voltage derivative applied to the coil arrangement is determined and compared with a reference value. If this voltage does not fall below the reference value in a desired minimum time within a measurement period, an error message is emitted in order to indicate a fault. If the voltage falls below the reference value, it is ensured that the magnetic field is sufficiently stable and measured values for a voltage which can be tapped off at measurement electrodes are subject to an offset error.

12 Claims, 2 Drawing Sheets

METHOD FOR OPERATING AN ELECTROMAGNETIC FLOWMETER AND ELECTROMAGNETIC FLOWMETER

CROSS REFERENCE TO RELATED APPLICATIONS

This application is the US National Stage of International Application No. PCT/EP2005/010224, filed Sep. 21, 2005 and claims the benefit thereof and is incorporated by reference herein in its entirety.

FIELD OF INVENTION

The invention relates to a method for operating an electromagnetic flowmeter and to an electromagnetic flowmeter for carrying out the method.

BACKGROUND OF THE INVENTION

DE 199 17 268 A1 describes a method for testing an electromagnetic flowmeter and a flowmeter. The flowmeter has a measuring tube and a coil arrangement which generates a magnetic field at right angles to the direction of flow through the measuring tube, wherein the direction of the current flowing through the coil arrangement is periodically varied. In order to enable easy testing of the flowmeter, following a change in the direction of the current, at least one parameter of the current rise, for example, the rise time is determined and compared with a reference value. Provided the flowmeter is able to operate unimpeded and error-free, the rise shapes are practically identical, with a very small scatter. Only when an error of an electrical or magnetic nature occurs does the rise shape change. This change is a sign that the flowmeter possibly delivers imprecise measuring results and needs to be more closely examined or exchanged. This examination can take place during measurement of a flow. This has the advantage that the flow metering does not have to be interrupted for testing the flowmeter and that the flowmeter is able to perform testing of its function continuously or permanently. The flowmeter can be tested in precisely the condition in which it functions during normal operation. It is also known from the cited document, following switching of the current direction, to use a raised voltage, which is also known as the boost voltage. This accelerates the build-up of the magnetic field and also permits the actual measurement to be made in shorter measuring periods. When the desired current strength in the coil arrangement has been reached, the voltage is reduced and switching-over to regulation of a constant current in the coil arrangement takes place. With a constant current in the coil arrangement, in an ideal electromagnetic flowmeter, it would be possible to measure a voltage at the measuring electrodes that is directly proportional to the velocity of the medium flowing through the measuring tube. In practice, however, flowmeters are subject to measuring errors and these can be divided into two components: linearity errors and offset errors. Offset errors can also be referred to as zero point errors.

SUMMARY OF INVENTION

It is an object of the invention to provide a method for operating an electromagnetic flowmeter and a flowmeter for carrying out the method, which exhibit improved measuring accuracy.

In order to achieve this object, a method for operating an electromagnetic flowmeter and an electromagnetic flowmeter are provided. The dependent claims disclose advantageous developments.

The invention has the advantage that recognition of an offset error, which is largely caused by an unstable magnetic field, is made possible. If determination of a measurement value is carried out before the magnetic field has been stabilized, this has the consequence that a measurement signal which has an offset is read off at the measuring electrode. Since there is a significant delay between the coil current and the magnetic field generated, knowledge of the current strength alone is not a sufficient measure of the strength of the magnetic field. In addition, therefore, given a coil current which is kept constant, the voltage applied to the coil arrangement and/or its derivative is determined. If this lies outside a permissible tolerance range, the magnetic field has not yet stabilized sufficiently. The means necessary for this test can be realized either in the flowmeter itself or, alternatively, as a separate device which, for testing the flowmeter, is connected thereto.

The invention is based on the recognition that offset errors are mainly caused by an unstable magnetic field and that an unstable magnetic field leads to variable voltage values at the supply cables of the coil arrangement. An unstable magnetic field can therefore be ascertained by determining the voltage applied to the coil arrangement and/or its derivative and comparing the respective determined values with an allocated reference value. Offset errors can, in principle, have various different causes, for example, resistive, capacitive and inductive coupling between the measuring circuit and the coil exciting circuit. However, it has been found that variations in the magnetic field cause a relatively large offset error. One problem with flowmeters with periodically varying current direction in the coil arrangement can consist therein that the magnetic field in the measuring tube has not stabilized at the time point when the voltage on measuring electrodes for measurement value evaluation is evaluated. This leads to an induced voltage in the measuring circuit which is proportional to the change in the magnetic field and depends on the geometry of the measuring circuit. The following applies:

$$U_{induced} \propto \frac{\partial \phi}{\partial t},$$

where $U_{induced}$=the measurable induced voltage at the measuring electrodes $\phi$=magnetic flux.

The induced voltage overlies the part of the voltage that can be detected at the measuring electrodes and that is caused by the velocity of the medium flowing through the measuring tube. It is independent of the flow velocity and therefore appears as an offset error, the size of which depends on the rate of change of the magnetic field during the measuring phases. The rise time of the magnetic field is increased by various primary factors. These include the inductance of the coil arrangement, hysteresis losses, eddy currents and magnetic retardation. Without going into precise details concerning these factors, it can be stated that the inductance and hysteresis losses increase the rise time of the coil current, whereas eddy currents and magnetic retardation lead to the magnetic field in the measuring tube becoming delayed relative to the coil current. In order that the coil current reaches the desired level in a relatively short time, as previously explained, following reversal of the current direction, a boost voltage is applied to the coil arrangement. After the desired current has been reached, a constant current source is used to excite the coil arrangement. The eddy currents arising during the build-up of the magnetic field lead thereto that it takes a certain amount of time until the magnetic field has stabilized after a constant current is reached. As long as the magnetic field has not yet stabilized, the voltage applied to the terminals of the coil arrangement for regulating the constant current also cannot be stable. Faulty measurements can therefore easily be identified and rejected during measurement value calculation which, for example, involves averaging over a plurality of voltage values from the measuring electrodes, or a warning can be issued to a user if the remaining measuring phase is too short. Thus, the reliability of the measurement values is increased and the measuring accuracy is improved.

A further possibility for improving accuracy consists in allowing the measurement to start only when the voltage signal is relatively stable and therefore when the magnetic field is stable. In addition, the evaluating device can be configured such that the voltage measured at the measuring electrodes is only read for measurement value determination when the voltage applied to the coil arrangement and/or its derivative falls below the respective allocated reference value with the coil current kept constant.

The time point at which the voltage and/or its derivative falls below the respective allocated reference value can be compared with a further reference value. If this time point lies outside a predetermined tolerance range, for example, if less than 20% of the measuring period remains as the time interval with valid voltage values at the measuring electrodes, an error message is output. This has the advantage of providing a possibility for recognizing a fault in the coil arrangement. The time which elapses until stabilization of the magnetic field is exemplar-specific and deviations from a reference value determined, for example, at start-up indicate a change in the electrical or magnetic behavior of the coil arrangement caused by an error. This test can be carried out by the flowmeter itself or by an external device connected to the flowmeter.

In an advantageous manner, a further improvement in the measuring accuracy can be achieved if evaluation of a voltage detected at the measuring electrodes is interrupted if the voltage applied to the coil arrangement and/or its derivative exceeds the relevant allocated reference value. By this means, the voltage values at the measuring electrodes, which are subject to larger offset errors, are not included in the measurement value determination.

The reference value for the voltage applied to the coil arrangement can be predetermined in a particularly simple manner that is type-specific, from the resistance of the coil arrangement and the coil current which is kept constant. The reference value is preferably set 5% higher than this product. Good results were achieved in practical experiments using this value. The reference value for the derivative of the voltage can be stipulated, for example, on the basis of signal shapes recorded in the good condition on start-up of the flowmeter. A suitable value is, for example, twice the mean value of the derivative which is determined in the good condition, before the end of measuring periods.

In an advantageous manner, exemplar-specific compensation of the offset error caused by an unstable magnetic field is made possible if, on the basis of the measured voltage applied to the coil arrangement, according to a predetermined relation, a correction value is calculated by which the voltage detected at the measuring electrodes is corrected for measurement value determination. This predetermined functional relation is preferably determined at the flowmeter itself at an earlier time point, preferably at start-up. It is stipulated as a parameterized linear equation which is therefore made available for future compensation processes. Each flowmeter therefore receives an individually predetermined functional relation with which compensation of the offset error can be made very accurately.

In order that the limit value monitoring should not respond prematurely due to the noise which normally overlies measurement signals, in advantageous manner, the determined voltage and/or its derivative can first be filtered with a low-pass filter before the comparison is carried out with the respectively allocated reference value.

BRIEF DESCRIPTION OF THE DRAWINGS

The invention, its embodiments and advantages will now be described in greater detail by reference to the drawings which illustrate an exemplary embodiment of the invention. In the drawings.

DETAILED DESCRIPTION OF INVENTION

Figure 1:
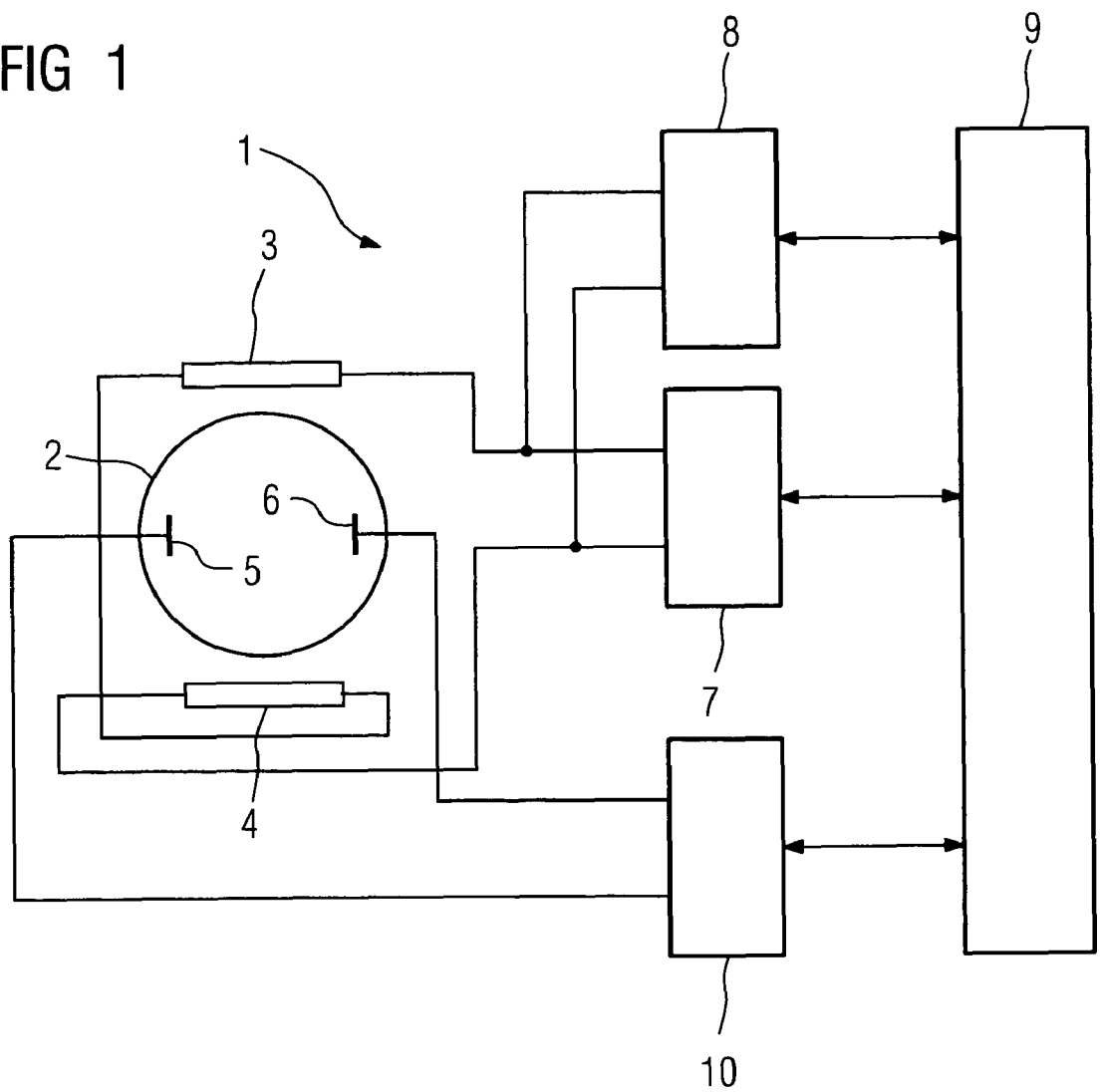
FIG. 1 shows a block circuit diagram of a flowmeter.

According to FIG. 1, an electromagnetic flowmeter 1 comprises a measuring tube 2 through which fluid flows perpendicularly to the drawing plane. The measuring tube 2 is electrically insulated. Arranged at the measuring tube 2 is a coil arrangement with two coils 3 and 4, which generate a magnetic field at right angles to the direction of flow when a current flows through the coils 3 and 4. Measuring electrodes 5 and 6 are provided in the measuring tube 2. These are arranged such that they detect a potential difference or voltage at right angles to the direction of flow and at right angles to the magnetic field. The voltage between the electrodes 5 and 6 is therefore proportional to the flow velocity of the medium flowing through the measuring tube 2 and to the strength of the magnetic field. The coils 3 and 4 are connected in series and are supplied, via a control device 7, with the voltage required for generating a magnetic field. Provided in the control device 7, in known manner, for reversing the direction of the coil current is an H-bridge circuit which, for reasons of clarity, is not shown in the drawing. Furthermore, the control device 7 comprises, in a known manner, an additional voltage supply device which, following the change in current direction, initially creates a "boost voltage" for rapid build-up of the magnetic field. As soon as the current in the coil arrangement has reached a predetermined value, it is regulated in the control device 7 in order to ensure a constant current through the coil arrangement during the measuring procedure. The voltage applied across the coil arrangement is now measured with a measuring device 8. The voltage values found are passed to the sequence control system and the evaluating device 9 for further processing. By means of a measuring device 10, the voltage arising at the measuring electrodes 5 and 6 is also detected and passed on to the sequence control system and the evaluating device 9 for measurement value determination, and this controls the sequence of the measuring procedures by suitable control of the control device 7 and suitable evaluation of the measurement values provided by the measuring devices 8 and 10, and calculates a measurement value for the flow velocity from the voltage values and this flow velocity is then passed to a higher level master terminal (for clarity, not shown in the drawing) together with status messages, in particular error messages.

Figure 2:
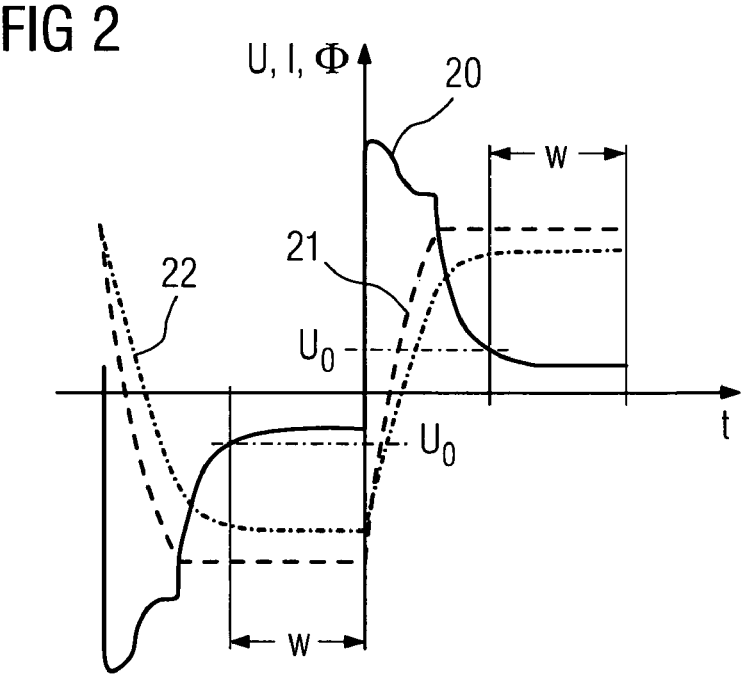
FIG. 2 shows a graph of voltage and current against time for the coil arrangement, and the magnetic flux density of the magnetic field.

FIG. 2 shows the qualitative variation 20 of the voltage U applied to the coil arrangement, the variation 21 of the current I flowing through the coil arrangement and the shape 22 of the magnetic flux φ generated. Shown on the abscissa is time t and on the ordinate, voltage U, current I and magnetic flux φ. It is clear from the figure that the build-up of the magnetic field with the magnetic flux, according to the shape 22, lags relative to the current I flowing through the coil arrangement, which has the shape 21. The strength of the magnetic flux is still changing while the coil current is already being kept at a constant value. However, while the magnetic flux is changing, a voltage is induced in the measuring circuit formed by the electrodes 5 and 6 and the conductors leading to the measuring device 10 (FIG. 1), and this voltage falsifies the values detected at the electrodes which, in an ideal case, should be proportional to the flow velocity. The relationships between the voltage $V_{coil}$ applied to the coil arrangement, the current $I_{coil}$ flowing through the coil arrangement, the electrical resistance of the coil arrangement $R_{coil}$, the magnetic flux $\phi_{coil}$ prevailing in the coil arrangement, the eddy currents $I_{eddy}$ induced in the electrically conductive parts of the flowmeter, the voltage prevailing there $V_{eddy}$, the electrical resistance $R_{eddy}$ which these electrically conductive component parts have, the magnetic flux $\phi_{eddy}$ prevailing in said parts, the self-inductance $L_{eddy}$ of the parts, the self-inductance $L_{coil}$ of the coil arrangement, the mutual inductance M between the coil arrangement and the component parts, and the magnetic field φ in the measuring tube can be described with the following formulae:

$$V_{coil} - R_{coil} \cdot I_{coil} = \frac{\partial \phi_{coil}}{\partial t}; \phi_{coil} = L_{coil} \cdot I_{coil} + M \cdot I_{eddy}$$

$$V_{eddy} - R_{eddy} \cdot I_{eddy} = \frac{\partial \phi_{eddy}}{\partial t}; \phi_{eddy} = L_{eddy} \cdot I_{eddy} + M \cdot I_{coil}$$

$$V_{eddy} = 0$$

$$\phi = L_{coil} \cdot I_{coil} + L_{eddy} \cdot I_{eddy}$$

From these equations, a relationship can be derived between the voltage $U_{induced}$ induced in the measuring system and the voltage measured across the coil arrangement:

$$\begin{aligned} U_{induced} &\propto \frac{\partial \phi}{\partial t} = L_{coil} \cdot \frac{\partial I_{coil}}{\partial t} + L_{eddy} \cdot \frac{\partial I_{eddy}}{\partial t} \\ &= \frac{\partial \phi_{coil}}{\partial t} - M \cdot \frac{\partial I_{eddy}}{\partial t} + \frac{\partial \phi_{eddy}}{\partial t} - M \cdot \frac{\partial I_{coil}}{\partial t} \\ &= (V_{coil} - R_{coil} \cdot I_{coil}) - R_{eddy} \cdot I_{eddy} - \\ &\quad M \cdot \left( \frac{\partial I_{eddy}}{\partial t} + \frac{\partial I_{coil}}{\partial t} \right) \end{aligned}$$

In the last expression of the above equation, due to the constant current regulation in the coil, $$\frac{\partial I_{coil}}{\partial t} = 0.$$

It is thus apparent from the equation that no voltage is induced in the measuring circuit if the coil current is constant and the eddy currents have died away. In this case, the following applies: $V_{coil} = R_{coil} \cdot I_{coil}$. Furthermore, the voltage induced in the measuring circuit after the eddy currents have died away is proportional to the expression $(V_{coil} - R_{coil} \cdot I_{coil})$. A proportionality factor which is required in order to derive from this proportionality an equation as a functional relationship is determined by exemplar-specific calibration during a first start-up of the flowmeter and stored for later compensation of an offset error. In order to make the influence of the offset error on the measurement value smaller, the calculation of the measurement value uses only voltage values measured at the measuring electrodes within a measuring window W. The measuring window W begins at the time point at which the voltage U measurable at the coil arrangement falls below a predetermined reference value $U_0$. Correspondingly, with the current direction reversed, the measuring window W begins when the value of the voltage U falls below the reference value $-U_0$. This ensures that measurement takes place with a sufficiently stable magnetic field. If the length of the measuring window W falls below a predetermined minimum value, this is indicated by means of a status notification. In such an event, the magnetic field could not be sufficiently stabilized within the measuring period, and this indicates an error in the flowmeter.

Figure 3:
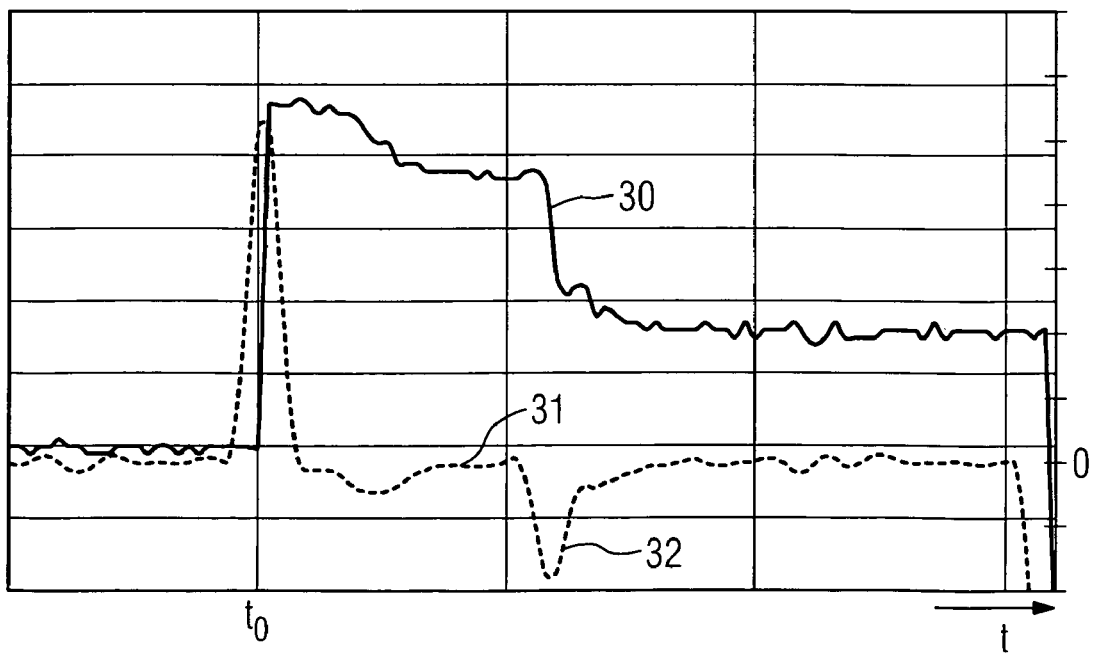
FIG. 3 shows a graph of voltage against time for the coil arrangement and for its derivative.

FIG. 3 shows in more detail, as graphs against time, the shape 30 of the voltage measured at the coil arrangement and the shape 31 of the derivative of this voltage. The width of the pulse in the graph 31 of the derivative at the time point $t_0$ of the current reversal results from the algorithm used for calculating the derivative. As described above, in an ideal case, the voltage should be constant throughout the measuring window and its derivative over time should be zero in order that no voltage should be induced in the measuring circuit as a result of changes in the magnetic field. A pulse 32 in the course 31 of the derivative occurs at the time point at which the boost voltage is switched off, at which switching over to constant regulation of the current fed into the coil arrangement takes place. In order to assess the stability of the magnetic field, it can easily be monitored to discover when, following the pulse 32, the shape 31 re-enters a tolerance band enclosing the value zero. If, at this time point, the curve 30 also lies within a tolerance band about an asymptotic end value which corresponds, as mentioned above, to the product of the coil resistance and the coil current, measurements of the flow rate can be made with sufficient reliability. On the other hand, an error message may be issued to indicate a fault if the tolerance bands are not reached in a required minimum time within a measuring period.

The sequence control system and evaluating device 9 as per FIG. 1 is carried out with a microprocessor control system, wherein the firmware required therefor is stored in a memory. The requisite functions for detecting the voltage applied to the coil arrangement, for finding its derivative, for filtering to reduce the signal noise, for reference value comparison and for measurement value calculation can be carried out with extensions of the firmware. Once it has been created, the software necessary, given that a large number of flowmeters are produced, has hardly any influence on their manufacturing cost.

The invention claimed is:

1. A method for operating an electromagnetic flowmeter having a measuring tube and a coil arrangement for generating a magnetic field at right angles to the direction of flow through the measuring tube, comprising:

periodically varying the direction of the current flow through the coil arrangement;

maintaining an electrical current flowing through the coil arrangement substantially constant;

determining a voltage and/or a voltage derivative applied to the coil arrangement; and comparing the determined voltage and/or voltage derivative with an allocated reference value.

2. The method as claimed in claim 1, wherein an evaluation of a voltage detected at measuring electrodes for measurement value determination begins when the voltage and/or the voltage derivative at the coil arrangement falls below the respective allocated reference value when the coil current is maintained constant.

3. The method as claimed in claim 2, wherein a time point at which the voltage and/or the voltage derivative falls below the respective allocated reference value is compared with a further reference value and that an error message is output if this time point falls below the further reference value.

4. The method as claimed in claim 3, wherein the evaluation of the voltage detected at the measuring electrodes is interrupted if the voltage and/or the voltage derivative applied to the coil arrangement exceeds the relevant allocated reference value.

5. The method as claimed in claim 4, wherein the reference value for the voltage applied to the coil arrangement is 5% higher than a product of the electrical resistance of the coil arrangement and the coil current which is maintained constant.

6. The method as claimed in claim 5, wherein, on the basis of the measured voltage applied to the coil arrangement, according to a predetermined functional relation, a correction value is calculated, by which the voltage detected at the measuring electrodes is corrected for measurement value determination.

7. The method as claimed in claim 6, wherein the voltage and/or the voltage derivative determined is first filtered with a low pass filter.

8. An electromagnetic flowmeter, comprising:

a measurement tube;

a coil arrangement for generating a magnetic field at right angles to the direction of flow through the measuring tube, wherein the direction of the current flow through the coil arrangement is periodically varied and, within a period, following a rise to a predetermined value, the current is kept substantially constant; and a measuring device with which, with the coil current kept constant, a voltage and/or a voltage derivative applied to the coil arrangement is determined and an evaluating device is configured such that the respective value determined is compared with an allocated reference value.

9. The electromagnetic flowmeter as claimed in claim 8, wherein the evaluation of the voltage detected at the measuring electrodes is interrupted if the voltage and/or the voltage derivative applied to the coil arrangement exceeds the relevant allocated reference value.

10. The electromagnetic flowmeter as claimed in claim 9, wherein the reference value for the voltage applied to the coil arrangement is 5% higher than a product of the electrical resistance of the coil arrangement and the coil current which is maintained constant.

11. The electromagnetic flowmeter as claimed in claim 10, wherein, on the basis of the measured voltage applied to the coil arrangement, according to a predetermined functional relation, a correction value is calculated, by which the voltage detected at the measuring electrodes is corrected for measurement value determination.

12. The electromagnetic flowmeter as claimed in claim 11, wherein the voltage and/or the voltage derivative determined is first filtered with a low pass filter.

* * * * *